(12) United States Patent
Fleishman et al.

(10) Patent No.: US 8,015,506 B2
(45) Date of Patent: Sep. 6, 2011

(54) CUSTOMIZING A MENU IN A DISCOVERY INTERFACE

(75) Inventors: David Fleishman, Snoqualmie, WA (US); John Elsbree, Bellevue, WA (US); William Linzbach, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 11/657,244

(22) Filed: Jan. 24, 2007

(65) Prior Publication Data
US 2008/0126984 A1 May 29, 2008

Related U.S. Application Data

(60) Provisional application No. 60/846,514, filed on Sep. 22, 2006.

(51) Int. Cl.
*G06F 3/048* (2006.01)
(52) U.S. Cl. ............ 715/810; 715/744; 725/37; 725/39; 725/40; 725/50; 725/51; 725/52; 725/56; 725/61
(58) Field of Classification Search .......... 715/810, 715/744; 725/39–61
See application file for complete search history.

(56) References Cited

U.S. PATENT DOCUMENTS

| | | | |
|---|---|---|---|
| 5,602,597 A * | 2/1997 | Bertram | 725/56 |
| 5,815,145 A * | 9/1998 | Matthews, III | 725/41 |
| 5,864,868 A | 1/1999 | Contois | |
| 5,892,905 A | 4/1999 | Brandt et al. | |
| 5,929,932 A * | 7/1999 | Otsuki et al. | 725/47 |
| 6,009,410 A | 12/1999 | LeMole et al. | |
| 6,078,322 A | 6/2000 | Simonoff et al. | |
| 6,098,096 A | 8/2000 | Tsirigotis et al. | |
| 6,131,088 A | 10/2000 | Hill | |
| 6,169,543 B1 * | 1/2001 | Wehmeyer | 725/47 |
| 6,182,094 B1 | 1/2001 | Humpleman et al. | |
| 6,182,133 B1 | 1/2001 | Horvitz | |
| 6,334,157 B1 | 12/2001 | Oppermann et al. | |
| 6,345,386 B1 | 2/2002 | Delo et al. | |
| 6,385,641 B1 | 5/2002 | Jiang et al. | |
| 6,388,686 B1 | 5/2002 | Hetherington et al. | |
| 6,405,316 B1 | 6/2002 | Krishnan et al. | |
| 6,427,236 B1 | 7/2002 | Chamberlain et al. | |

(Continued)

FOREIGN PATENT DOCUMENTS

WO WO9909744 A1 2/1999

(Continued)

OTHER PUBLICATIONS

Rekimoto et al., "DataTiles: A Modular Platform for Mixed Physical and Graphical Interactions", Date: 2001, http://alumni.media.mit.edu/~ullmer/papers/datatiles-chi01.pdf.

(Continued)

*Primary Examiner* — Dennis-Doon Chow
*Assistant Examiner* — Shen Shiau (57) ABSTRACT

A system provides customized user interface data to a media application, such as a media discovery interface, or to any application for that matter, thereby extending the original application. Via a network connection, elements of a menu in a user interface can be downloaded to the application in a package of resources, including images, text, and links. A user interface framework of the media application processes a menu markup data resident on the local computer system and utilizes packaged resources, local code components, and externally-obtained (e.g., Web resources) to render a customized menu for the media application.

20 Claims, 7 Drawing Sheets

U.S. PATENT DOCUMENTS

| | | | |
|---|---|---|---|
| 6,442,755 B1* | 8/2002 | Lemmons et al. | 725/47 |
| 6,469,713 B2 | 10/2002 | Hetherington et al. | |
| 6,469,714 B2 | 10/2002 | Buxton et al. | |
| 6,675,228 B1 | 1/2004 | Bahrs et al. | |
| 6,721,780 B1 | 4/2004 | Kasriel et al. | |
| 6,731,312 B2 | 5/2004 | Robbin | |
| 6,810,410 B1 | 10/2004 | Durham | |
| 6,876,314 B1 | 4/2005 | Lin | |
| 6,904,609 B1 | 6/2005 | Pietraszak et al. | |
| 6,917,933 B2 | 7/2005 | Craig et al. | |
| 6,934,697 B1 | 8/2005 | Warren | |
| 6,941,324 B2 | 9/2005 | Plastina et al. | |
| 6,948,135 B1 | 9/2005 | Ruthfield et al. | |
| 6,978,472 B1 | 12/2005 | Nashida et al. | |
| 6,990,654 B2 | 1/2006 | Carroll, Jr. | |
| 7,028,264 B2 | 4/2006 | Santoro et al. | |
| 7,032,178 B1 | 4/2006 | McKnight et al. | |
| 7,047,485 B1 | 5/2006 | Klein et al. | |
| 7,069,310 B1 | 6/2006 | Bartholomew | |
| 7,093,248 B2 | 8/2006 | Kamalanathan et al. | |
| 7,111,243 B1 | 9/2006 | Ballard et al. | |
| 7,197,715 B1* | 3/2007 | Valeria | 715/747 |
| 7,310,516 B1 | 12/2007 | Vacanti et al. | |
| 7,313,805 B1* | 12/2007 | Rosin et al. | 725/45 |
| 7,340,093 B2 | 3/2008 | Yamamichi | |
| 7,340,693 B2 | 3/2008 | Martin et al. | |
| 7,343,550 B2 | 3/2008 | Saidenberg et al. | |
| 7,509,374 B2 | 3/2009 | Trinh et al. | |
| 7,890,853 B2 | 2/2011 | Neil et al. | |
| 2002/0047894 A1 | 4/2002 | Steading et al. | |
| 2002/0057297 A1 | 5/2002 | Grimes et al. | |
| 2002/0120940 A1 | 8/2002 | Willard | |
| 2002/0129064 A1 | 9/2002 | Guthrie | |
| 2003/0084449 A1* | 5/2003 | Chane et al. | 725/46 |
| 2003/0131355 A1* | 7/2003 | Berenson et al. | 725/46 |
| 2003/0149574 A1 | 8/2003 | Rudman | |
| 2003/0167409 A1 | 9/2003 | Sussman | |
| 2003/0204833 A1 | 10/2003 | Pokhariyal | |
| 2004/0049536 A1 | 3/2004 | Wand et al. | |
| 2004/0098360 A1 | 5/2004 | Witwer et al. | |
| 2004/0154039 A1 | 8/2004 | Simms et al. | |
| 2004/0205484 A1 | 10/2004 | Pennington et al. | |
| 2004/0226042 A1* | 11/2004 | Ellis | 725/43 |
| 2004/0243971 A1 | 12/2004 | Leung | |
| 2005/0044058 A1 | 2/2005 | Matthews et al. | |
| 2005/0096980 A1 | 5/2005 | Koningstein | |
| 2005/0125357 A1 | 6/2005 | Saadat et al. | |
| 2005/0154652 A1 | 7/2005 | Bezos et al. | |
| 2005/0160414 A1 | 7/2005 | Parnanen | |
| 2005/0180428 A1 | 8/2005 | Chiu et al. | |
| 2005/0198191 A1 | 9/2005 | Carlson et al. | |
| 2005/0257208 A1 | 11/2005 | Blumfield et al. | |
| 2006/0014523 A1* | 1/2006 | Reilly | 455/412.1 |
| 2006/0026162 A1 | 2/2006 | Salmonsen et al. | |
| 2006/0059513 A1 | 3/2006 | Tang et al. | |
| 2006/0085825 A1 | 4/2006 | Istvan et al. | |
| 2006/0101338 A1 | 5/2006 | Kates | |
| 2006/0136872 A1 | 6/2006 | Barr et al. | |
| 2006/0174314 A1* | 8/2006 | Jacobs et al. | 725/135 |
| 2006/0175879 A1 | 8/2006 | Chiang et al. | |
| 2006/0206799 A1 | 9/2006 | Vidos et al. | |
| 2006/0259925 A1* | 11/2006 | Lemmons et al. | 725/39 |
| 2007/0028268 A1* | 2/2007 | Ostojic et al. | 725/52 |
| 2007/0067799 A1* | 3/2007 | Park et al. | 725/40 |
| 2007/0113264 A1* | 5/2007 | Rothschild | 725/135 |
| 2008/0071825 A1 | 3/2008 | Guo | |
| 2008/0077852 A1* | 3/2008 | Fleishman et al. | 715/234 |
| 2008/0126938 A1* | 5/2008 | Fleishman et al. | 715/721 |
| 2008/0126984 A1* | 5/2008 | Fleishman et al. | 715/810 |
| 2008/0163059 A1 | 7/2008 | Craner | |
| 2008/0178125 A1 | 7/2008 | Elsbree et al. | |

FOREIGN PATENT DOCUMENTS

| | | |
|---|---|---|
| WO | WO0021002 A1 | 4/2000 |

OTHER PUBLICATIONS

Richardson et al., "Virtual Network Computing", Date: Jan./Feb. 1998, vol. 2, No. 1, http://www.cl.cam.ac.uk/Research/DTG/publications/public/files/tr.98.1.pdf.

Rossi et al., "User interface patterns for hypermedia applications", Date: 2000, pp. 136-142, ACM Press, New York, US, http://elara.tk.informatik.tu-darmstadt.de/publications/2000/fer user.pdf.

"Windows Media Center", Sep. 2006, available at http://www.crug.com/pages/sept06nwlr.html.

Windows XP Media Center Edition 2005 Review, 2005, available at http://www.winsupersite.com/reviews/windowsxp_mce2005.asp.

Fan, Boading Hsieh, "When Channel Surfers Flip to the Web: Copyright Liability for Internet Broadcasting", Nov. 2000, available at http://law.indiana.edu/fclj/pubs/v52/no3/Fan.pdf.

Andersson et al., "Dynamic code update in JDrums", In Proceedings of the ICSE'00 Workshop on Software Engineering for Wearable and Pervasive Computing, Limerick, Ireland, 2000.

Davison, Brian D., "A Web Caching Primer", IEEE Internet Computing, vol. 5, Issue 4, Jul. 2001.

Vandewoude et al., "An Overview and Assessment of Dynamic Update Methods for Component-oriented Embedded Systems", Proceedings of The International Conference on Software Engineering Research and Practice, Las Vegas, USA, 2002.

Buchholz et al., "Adaptation-Aware Web Caching: Caching in the Future Pervasive Web", Kommunikation in Verteilten Systemen (KiVS), Leipzig, Germany, 2003.

Final Office Action and Notice of References cited for U.S. Appl. No. 11/657,356, dated Apr. 14, 2011, 13 pages.

* cited by examiner

CUSTOMIZING A MENU IN A DISCOVERY INTERFACE

CROSS-REFERENCE TO RELATED APPLICATIONS

The present application claims benefit of U.S. Provisional Patent Application No. 60/846,514, entitled "Customizing a Menu in a Discovery Interface" and filed on Sep. 22, 2006, which is specifically incorporated by reference for all that it discloses and teaches.

The present application is related to U.S. patent application Ser. No. 11/657,356, entitled "Customizing Applications in a Discovery Interface" and filed on Jan. 24, 2007, and U.S. patent application Ser. No. 11/657,439, entitled "Customizing Application Page Loading in a Discovery Interface" and filed on Jan. 24, 2007, which are specifically incorporated by reference for all that they disclose and teach.

BACKGROUND

The convergence of computing and entertainment continues to provide new content and options for consumers. For example, cable subscribers can now access cable television programs and video-on-demand content (VOD) through their set-top boxes. In one offering, a video-on-demand service allows a user to select a program for viewing from a library of programs, wherein all of the programs are available at any time and can be paused, saved, reviewed, etc. (as opposed to a cable television program that is only available at a scheduled time and duration). Other sources of content may also exist, including content from a media library, an Internet Protocol (IP) stream, a Web site, etc.

Consumers and content providers can find great benefit in the availability of content from so many different types of sources. For example, a consumer can view a rerun episode of a cable television program and then search for and view a subsequent episode of the same program over VOD or some other content providing channel. For their part, content providers can keep people "tuned in" with a wider assortment of content and content types.

In providing a user interface to access such a wide variety of content, certain media applications provide a discovery interface. In one existing example, a discovery interface takes the form of an Electronic Programming Guide (EPG). However, the available content, and more importantly, the ways in which to access such content may need to change dramatically overtime. Existing EPGs fail to adequately accommodate changes to the user interface and functionality of menus used to access the ever-changing content.

SUMMARY

Implementations described and claimed herein address the foregoing problems by providing customized user interface data for a media application, such as a media discovery interface, or to any application for that matter, thereby extending the original application. Via a network connection, elements of a start menu or any menu in a user interface can be downloaded to the media application in a package of resources, including images, text, and links. A user interface framework of the media application processes a menu markup data resident on the local computer system and utilizes packaged resources, local code components, and externally-obtained (e.g., Web resources) to render a customized menu for the media application.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Figure 1:
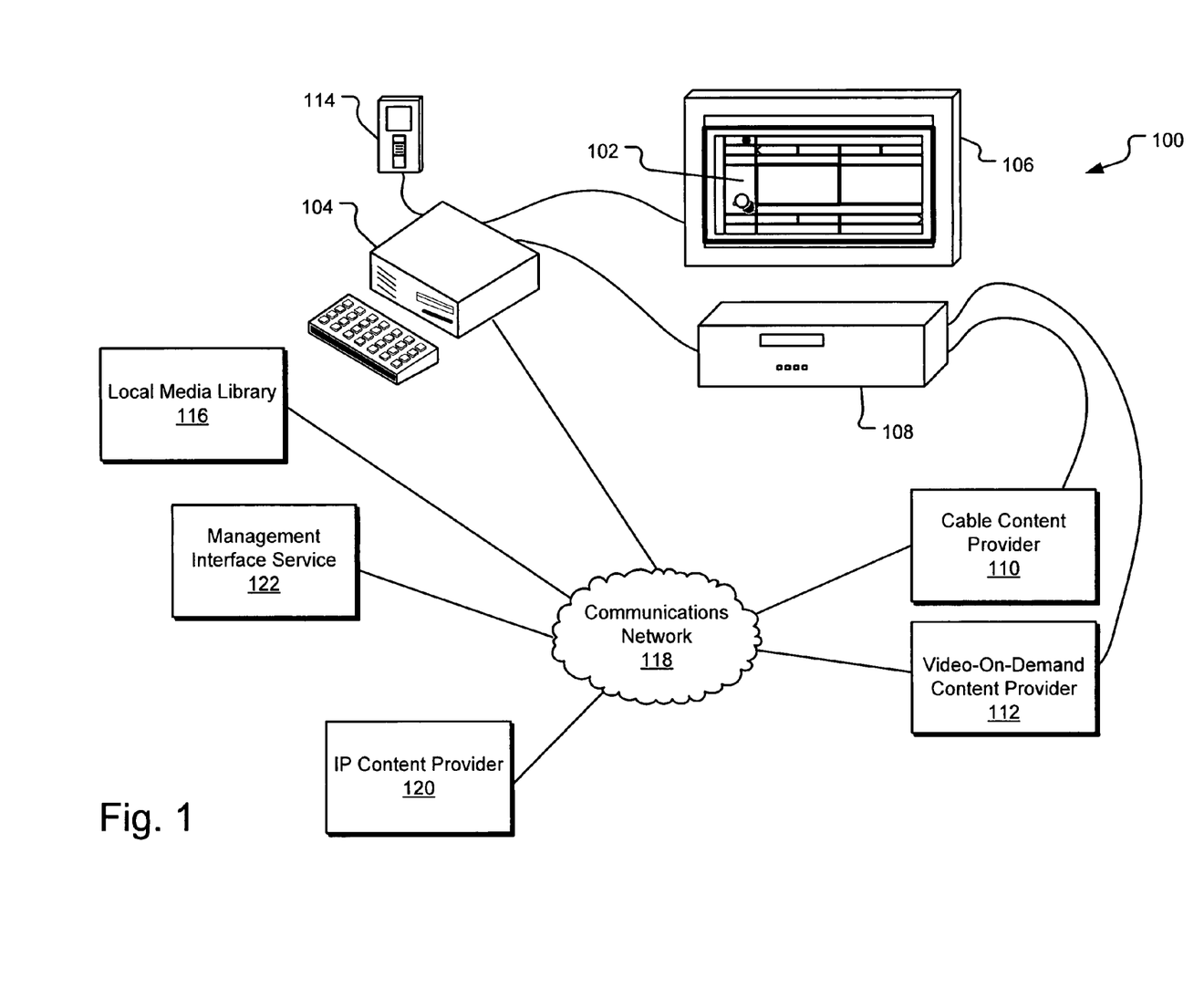
FIG. 1 illustrates an example system for presenting discovery data and applications in a customizable discovery interface.

FIG. 1 illustrates an example system 100 for presenting discovery data and applications in a customizable discovery interface 102 (which can include a menu, application page, etc.). A user's computing system 104 is coupled to a display device 106, which is capable of presenting the customizable discovery interface 102. The computing system 104 is also coupled to a tuner device 108 (e.g., a set-top box or a tuner card internal to the computing device), which communicates with a cable content provider 110 and a video-on-demand content provider 112. It should be understood that the cable content provider 110 and the video-on-demand content provider 112 may be represented by the same entity. Furthermore, content providers that compete with the cable providers, such as satellite services and airwave-based broadcast television stations, may also be supported in a similar manner. Content providers for other media, such as satellite radio, broadcast radio, etc., may also be supported through computing system 104.

In one implementation, the computing system 104 executes a media application that manages the user's access to media content, whether available locally or remotely. For example, the user can use his or her computing system 104 to control a portable media player 114, the tuner device 108, a local media library 116, and other content available from discrete devices or over a communications network 118. Examples of the control a user may apply can include without limitations transferring content between a portable media player 114 and a local media library 116, scheduling the recording of a cable television program by a digital video recorder (not shown) coupled to the computing system 104, downloading IP content (such as a video or song) from an IP content provider 120, etc.

In one implementation, the media application also provides the discovery interface 102 on a display device 106 (e.g., a monitor or television) coupled to the computing device 104. Discovery data is obtained through a media information service 122, which collects program information about content from a variety of sources. The media information service 122 maps data from a variety of sources to one or more consistent schema, enabling a consistent discovery experience, and associates the content from different sources to provide interrelationships among the content elements. The discovery interface 102 can be represented by an on-screen guide, such as an electronic program guide (EPG), although various monikers may be used in other implementations, including without limitation interactive program guide (IPG) and electronic service guide (ESG). The discovery interface 102 presents an on-screen guide to the available content (e.g., broadcast content, such as scheduled cable television programs, and non-broadcast content, such as available IP content, locally stored media, etc.) in which broadcast content and non-broadcast content are shown together via virtual channels of the unified discovery interface.

In one implementation, the discovery interface 102 provides a graphical user interface that can display program titles and other descriptive information (collectively "discovery data"), such as a summary, actors' names and bios, directors' names and bios, year of production, etc. In one implementation, the information is displayed on a grid with the option to select more information on each program, although other formats are also contemplated. Channel identifiers pertaining to the scheduled cable programs, the program start and end times, genres, thumbnail images, and other descriptive metadata can also be presented within the discovery interface 102. Radio and song information may offer other information, such as artist, album, album cover graphics, and track title information. The discovery interface 102 allows the user to browse program summaries; search by genre, channel, etc.; and obtain immediate access to the selected content, reminders, and parental control functions. If the computing device 104 is so configured or so connected, a discovery interface 102 can also provide control for scheduled recording of programs.

A user can use the discovery interface 102 to navigate, select, and discover content by a variety of parameters, including time, title, channel, genre, cost, actors, directors, sources, relationships to other content, etc. Navigation can be accomplished through the media application by a variety of input devices, such as a remote control, a keyboard, and a mouse. In one implementation, for example, the user can navigate through the discovery interface 102 and display information about scheduled cable programs, video-on-demand programs, and associated IP content within a single presentation frame. By navigating through the discovery interface 102, the user can manipulate and obtain more information about a current program or about other programs available through the discovery interface 102. For example, when the computing device 104 is connected to a cable content provider 110, the user can plan his or her viewing schedule, learn about the actors of available programs, and record cable programs to a hard disk in the computer device 104 for later viewing.

In one implementation, a customized application package can be downloaded to the computing system 104 in order to customize the data and applications available to the user through the discovery interface 102. The customized application package is typically downloaded from the management interface service 122, but customized application packages may be available from the local (or remote) media library 116 or from various content providers, such as content providers 110, 112, and 120. A customized application package may include without limitation images, listings of available content, text, markup language files, internal and external links used to present a customizable discovery interface to a user, etc. In one implementation, one or more menus of the discovery interface 102 may be customized with new images, text, functionality, selections, endpoints, etc. In another implementation, individual applications that are referenced from a menu or other selection may be customized.

Figure 2:
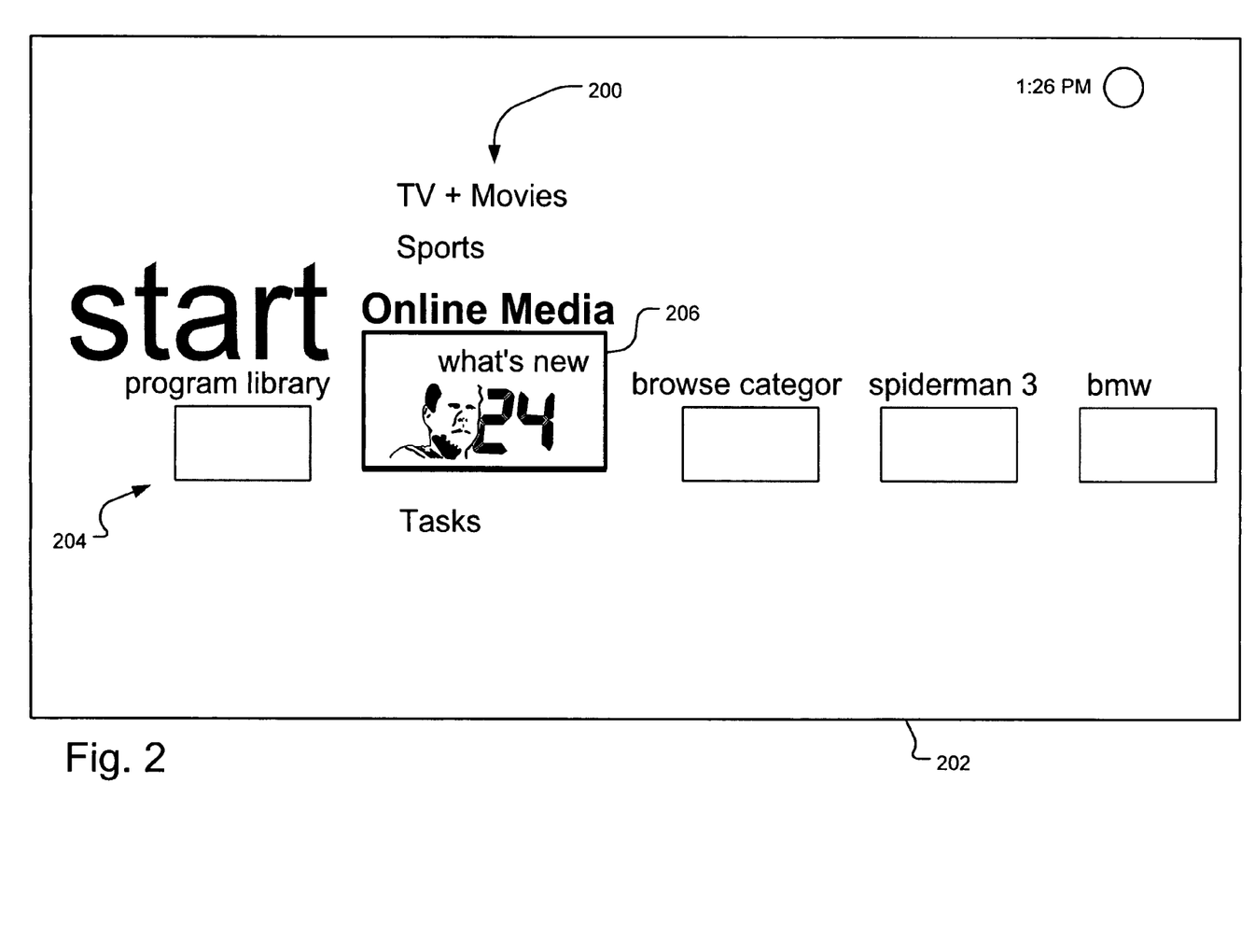
FIG. 2 illustrates an example menu within a customizable discovery interface.

FIG. 2 illustrates an example menu display 200 within a customizable discovery interface 202. The menu display 200 may include without limitation menu items for built-in application pages, customized application pages, and Web pages. Vertical menu items provide access to categories of offerings (e.g., "TV+Movies", "Sports", "Online Media", etc.). Within the current menu item (i.e., "Online Media"), several offering tiles are provided in an offering strip 204. By selecting one of the offering tiles (such as tile 206), a user can launch an application page or user interface page that provides functionality for the offering. For example, a user may select tile 206 to launch an application page that allows the user to browse and select various categories of new online media content, including for example content from ABC Online, FOXsports.com, FOX.com, Showtime Online, etc. The offering tiles themselves may be static (e.g., built-in and statically linked), have customizable faces (e.g., the linked application page is static, but the tile graphic displayed to the user may be updated using downloaded resources), fully customizable (e.g., the tile graphic, the linked application page may be updated using a downloaded package, etc.), or something in between.

In one implementation, the start menu is represented internally by a markup data file that specifies a user interface having a set of menu items and offering tiles. A user interface (UI) framework processes the start menu markup data and renders the start menu on the display accordingly. One or more of the menu items and/or offering tiles may be built into the media application executing on the computing system. For such built-in menu items or offering tiles, the start menu markup data merely has statically defined links to built-in application pages, which were installed with the media application or added to the media application in an update. One or more of the menu items or offering tiles may also be customizable. For these menu items or tiles, a placeholder exists in the start menu markup data, such that if resources have been downloaded for a specific placeholder, the menu item or offering tile is rendered for that placeholder.

In an alternative implementation, the start menu may be implemented using a package or a Web page, rather than a static markup data file. In such an implementation, the media application could access a downloaded package or Web page to render and provide functionality for the start up menu.

Portions of markup data for an example start menu (i.e., menu markup data) are shown below. A user interface framework processes the markup data, renders the appropriate resource on the display of the computing system and associates the appropriate functionality with each menu item. The menu markup data may be static or configurable through the media application. In the case of a static menu item, the parameters of the menu item are hard-coded into the media application. Nevertheless, menu markup data specifying static references may reference customizable menu items, wherein the application package file referenced the static references of the menu markup data may be replaced by an application package containing different resources.

In the example described below, markup data for menu items pertaining to third-party application pages, built-in application pages, and customized application pages is provided. In addition, a menu item may reference link to a Web page. A PartnerQuickLink element represents a start menu item for activating an external, third-party application that is resident on the user's computer system, such as Napster.

```
<home:PartnerQuickLink
    Icon="SM.Spotlight.Promo"
    Title="#SM.Spotlight.Promo1"
    ViewTemplate="QuickLinkView"
    AppId="[Spotlight]"
    EntryPointId="[SpotlightPromo1EP]"
    Priority="11"/>
```

A QuickLink element represents a start menu item for activating a built-in application page.

```
<home:QuickLink
    Icon="SM.Spotlight.Favorites"
    Title="#SM.Spotlight.Favorites"
    ViewTemplate="QuickLinkView"
    AppId="[Spotlight]"
    EntryPointId="[SpotlightFavoritesEP]"
    Priority="10"/>
```

A PackageMarkupQuickLink element represents the start menu items capable of being activated via an application package (i.e., a customized menu item) and of activating a customized application page.

```
<home:PackageMarkupQuickLink
    ResourceProviderId="Spotlight"
    TitleId="1011"
    ImageBaseName="StartMenu.QuickLink.Spotlight.1"
    TargetPageId="1012"
    ViewTemplate="QuickLinkView"
    AppId="[Spotlight]"
    Priority="0"/>
```

The PackageMarkupQuickLink menu items activate themselves by looking for the corresponding resources in the package identified by the ResourceProviderId. For example, the first PackageMarkupQuickLink above will be activated if the "Spotlight" package contains a string resource with ID 1011 (the value of the TitleId property) as well as the image resources having IDs "StartMenu.QuickLink.Spotlight.1.Focus.png" and "StartMenu.QuickLink.Spotlight.1.NoFocus.png" (each of these names being formed by appending strings (e.g., Focus or NoFocus) to the value of the ImageBaseName property). TargetPageID references a string resource in the package. That string resource, in turn, contains the name of the target application page that results in activation of the Start menu item. The Priority specifies which item in the menu should be the default item (the item that is given focus when the menu is first displayed). In one implementation, for example, a lower numeric value corresponds to a higher priority. The highest-priority item—among those items that are marked "visible"—will be the default item when the menu is displayed.

Alternatively, if no resources have been downloaded for a specific placeholder, the menu item or offering tile is "hidden" (i.e., not displayed). If the rendered menu item or tile for a customized offering is selected, the user interface framework opens the package referenced by the placeholder and renders the customized application page using the packaged markup data and resources contained in the package. Furthermore, one or more of the menu items or offering tiles may reference Web pages available over a network (or even HTML pages stored within or otherwise accessible by the media application).

Figure 3:
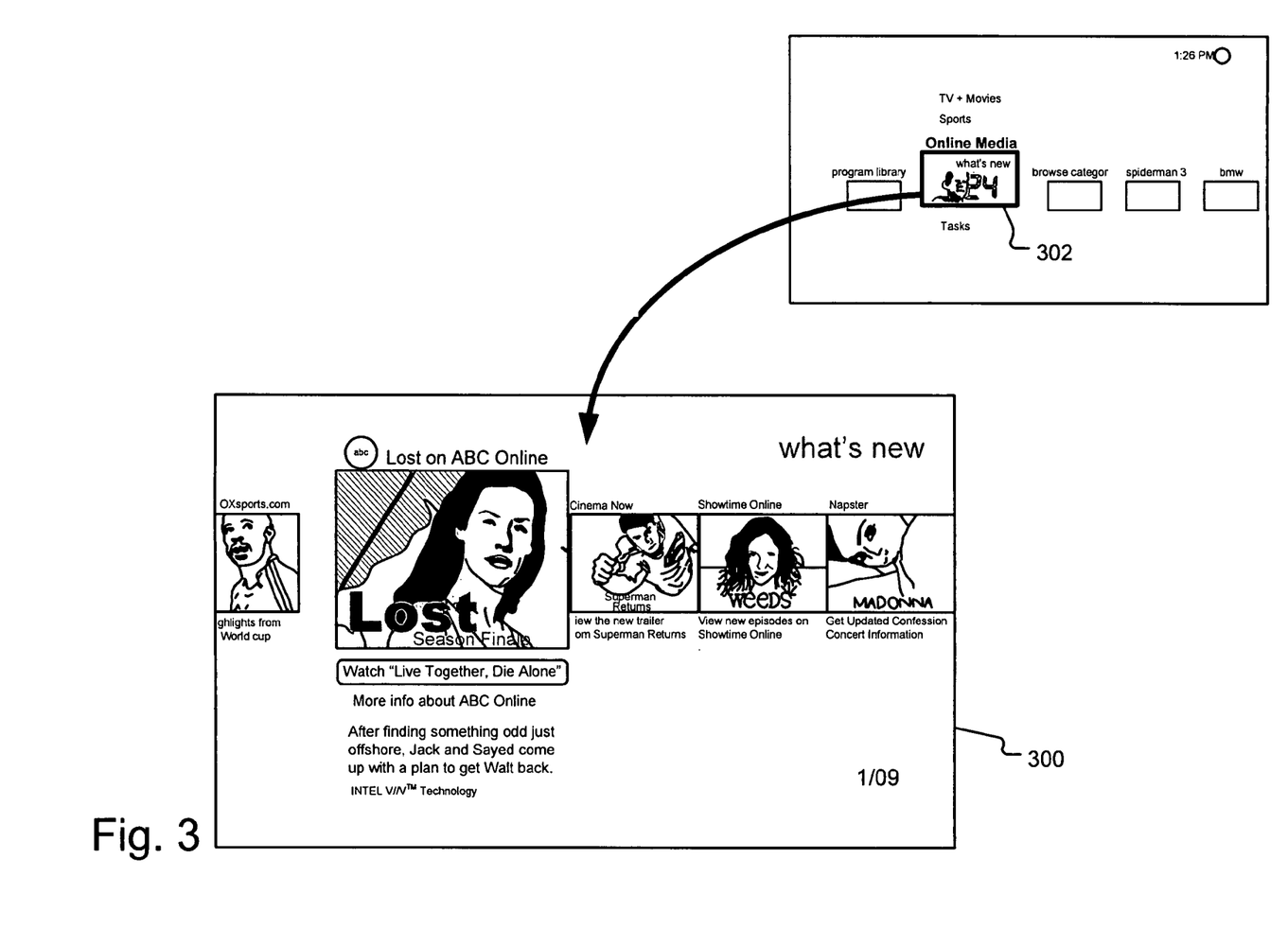
FIG. 3 illustrates an example application page that can be triggered by a selection of an offering tile.

FIG. 3 illustrates an example application page 300 that can be triggered by a selection of an offering tile 302 from a menu. The application page 300 may be (a) a built-in application page, which uses markup data that is built-in into the media application on the computing system; (b) a customized application page, which uses markup data downloaded in a package from a remote source; or (c) a Web application page, which is retrieved upon selection from a Web source. Other types of application pages may also be employed. Each menu item and/or offering tile in the application page can further invoke other built-in, customized, Web or other application pages.

Figure 4:
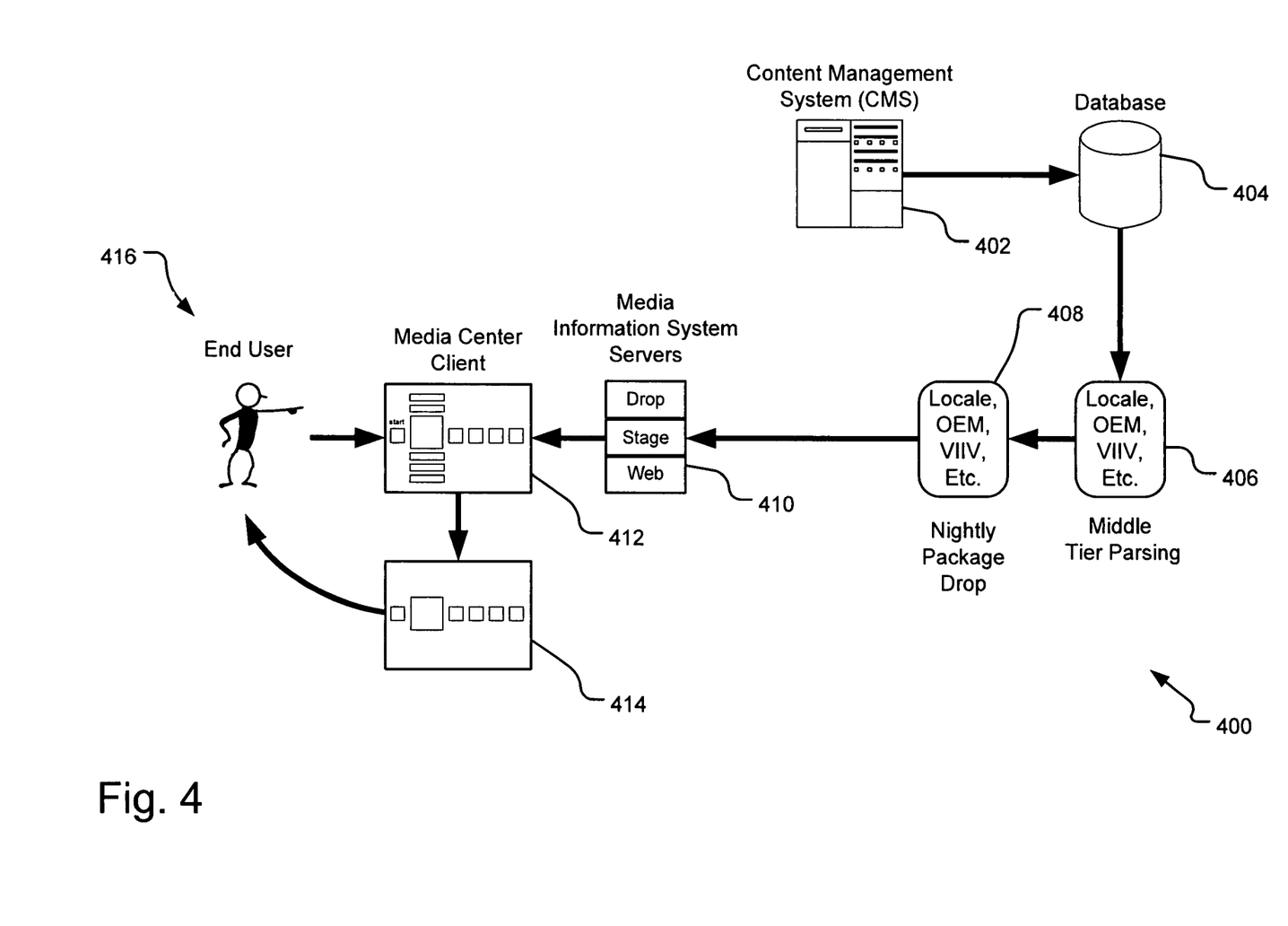
FIG. 4 illustrates an example content management and delivery system.

FIG. 4 illustrates an example content management and delivery system 400. A content management system 402 collects and stores media data, including without limitation one or more of program listings, content, customizing packages, parental ratings, preferences, and other parameters, into a database 404. A middle tier parsing module 406 extracts an application package (e.g., for a customized application page) based on predefined filtering parameters, including geographical locale, OEM relationship of the equipment, system capabilities, user preferences and characteristics, etc. A package drop module 408 periodically uploads selected packages to a media information system server 410, which has information specifying "drop", "stage", and "Web" parameters. Drop refers to the internal location where a package is stored for the delivery service to pickup. Stage refers to a testing location where a package can be downloaded and verified. Web refers to the final network location (e.g., an IP address or URI) where customers will have the package delivered to them. The media information system server 410 downloads the packages to a media application on a client computing system (e.g., screenshot icon 412 represents a start menu and screenshot icon 414 represents an application page).

An end user 416 can then interact with the media application executing on the client computing system to select offerings. For example, the end user 416 can select an offering tile from the start menu to access a built-in application page, a customized application page, or a Web application page. In some implementations, the end user 416 may employ a remote control, a keyboard, a mouse, a touch screen, etc. to interact with the media application.

Figure 5:
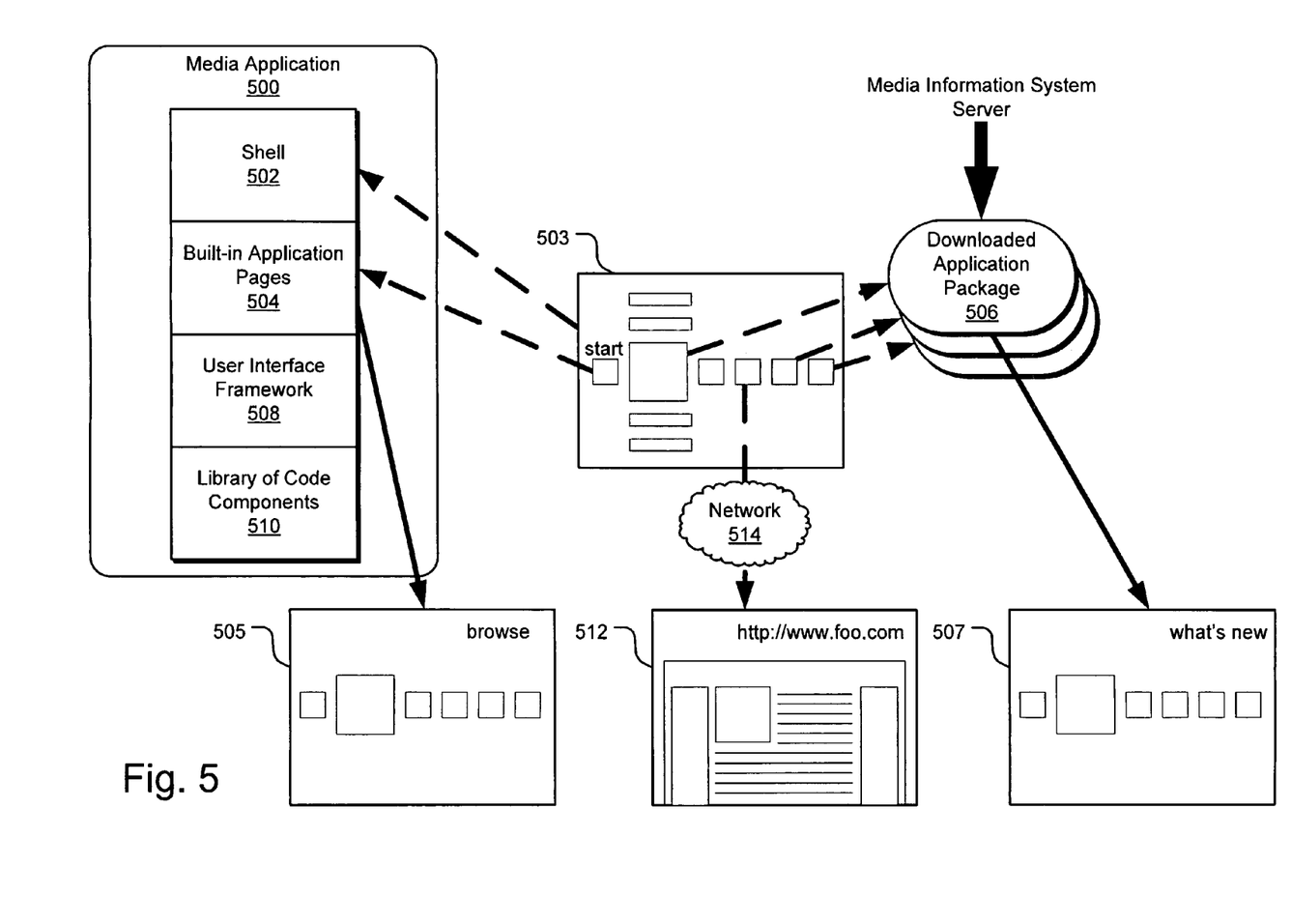
FIG. 5 illustrates an architecture for a example media application.

FIG. 5 illustrates an architecture for a example media application 500, although it should be understood that a similar architecture may be employed in non-media applications. A shell 502 represents a core user interface module of the media application, including the start menu markup data, resources, and other structural aspects of the media application. A menu page 503, and all other user interface pages, are rendered based on markup data, resources, local libraries of code components 510, and other data and program code by the user interface framework 508.

Built-in application pages 504 represent application pages (such as a built-in-in application page 505) that are incorporated into the distribution of the media application, including markup data and resources for individual application pages accessible through the start menu and other offering tiles of the media application. Application packages 506 represent customized application pages (such as a customized application page 507) that have been downloaded in package form, including markup data and resources of customized applications within the media application. Such packages are typically downloaded to the client computer system on which the media application executes during expected idle periods (e.g., overnight). Web application pages (such as Web page 512) may be linked to Web resources and downloaded via a network 514.

A user interface framework 508 processes the markup data of the shell 502, the built-in application pages 504, and the downloaded application pages 506. As for the shell 502, the user interface framework 508 parses the start menu markup data, for example, and renders the start menu defined by the markup data. In the cases of both built-in application pages 504 and downloaded application pages 506, when the appropriate application is triggered (e.g., by activation of an offering tile by the user), the user interface framework 508 ingests the markup language of the application pages referenced by the trigger and renders the application page defined by the markup data.

The markup data for application pages 504 and 506 and the shell 502 can reference code in a library 510 of code components. These code components provide functionality, such as manipulating and filtering tables of content metadata, initiating and controlling playback of media content, and interacting with the operating system, etc. The markup data references a specific code component and the user interface framework 508 includes the functionality to execute the code in the context of the current user interface.

Figure 6:
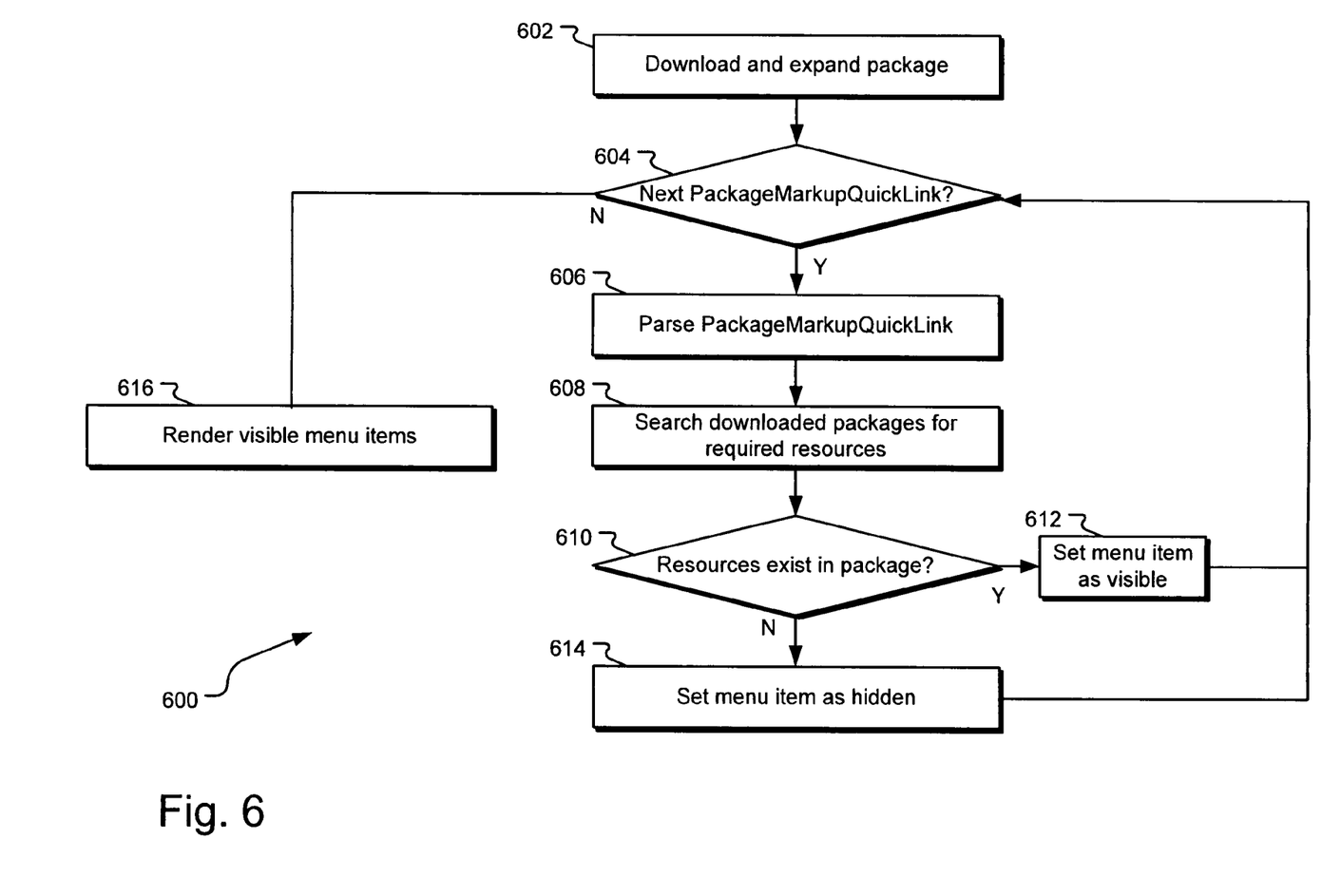
FIG. 6 illustrates example operations for customizing a start menu in a discovery interface.

FIG. 6 illustrates example operations 600 for customizing a menu in a discovery interface. A downloading operation 602 downloads a menu package, which may include without limitation images, text, and other resources received via a communications network (e.g., via a Web service). Each resource is associated with a resource identifier (ID). The user interface framework renders the display based on the markup data in the menu installed on the client computing system.

A decision operation 604 determine if and where a PackageMarkupQuickLink object is indicated in the start menu markup data. If such an object is found, a parsing operation 606 parses the elements of the PackageMarkupQuickLink to identify a downloaded package and resource IDs to which it refers. It should be understood that other entries for other links (e.g., QuickLink and PartnerQuickLinkelements) may also be parsed and processed, although this description focuses on the processing of a PackageMarkupQuickLink element.

A searching operation 608 searches any downloaded packages to find the identified package and then searches that package for the identified resource IDs. If the package is found and required resources are available in the package (as determined by a decision operation 610), then the resources will be associated with the PackageMarkupQuickLink, which will be set as "visible" in a setting operation 612. Otherwise, the PackageMarkupQuickLink will be set to "hidden" in a setting operation 614. Processing then returns to the decision operation 604, which searches for the next PackageMarkupQuickLink and continues to process it. If no next PackageMarkupQuickLink exists in the start menu, then a rendering operation 616 renders the visible menu items on the computer system's display.

Figure 7:
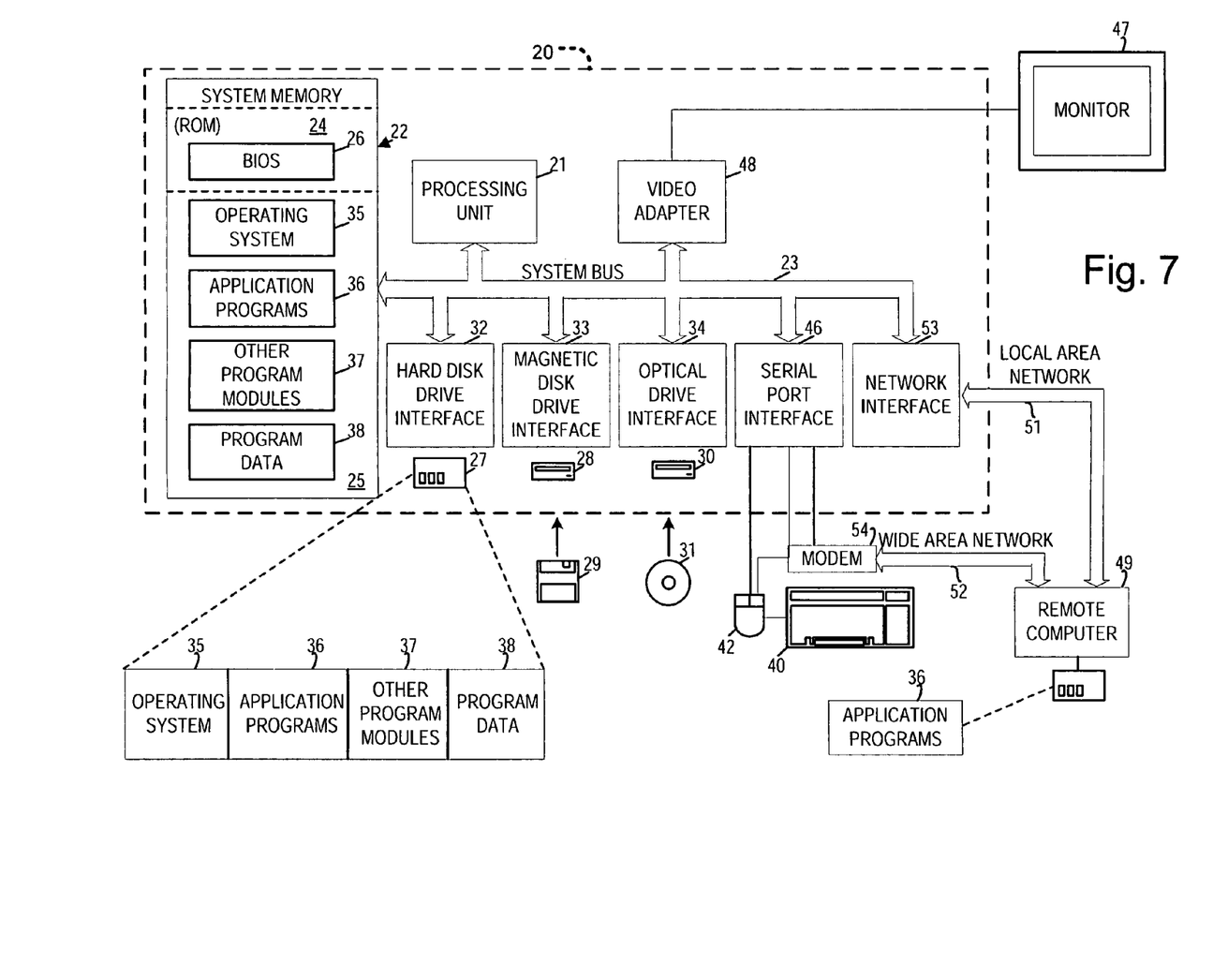
FIG. 7 illustrates an example system that may be useful in implementing the described technology.

The example hardware and operating environment of FIG. 7 for implementing the invention includes a computing device, such as general purpose computing device in the form of a gaming console or computer 20, a mobile telephone, a personal data assistant (PDA), a set top box, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via a display interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a user interface framework module, a download module, a discovery interface module, a library of code components, and other modules may be embodied by instructions stored in memory 22 and/or storage devices 29 or 31 and processed by the processing unit 21. A personal media library, content, databases, markup data, menu packages, resources, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of presenting a customized menu item in a menu display of a media application, the method comprising:
receiving one or more application packages from a communications network at a computer system, wherein each application package contains one or more resources for customized application pages of the media application;
storing the one or more application packages on the computer system in a storage system external to the media application;
accessing internal menu markup data of the media application for rendering a set of menu items for the menu display;
determining that the internal menu markup data indicates that the set of menu items for the menu display includes one or more built-in menu items installed with the media application, wherein:
the internal menu markup data specifies a reference to a built-in application page of the media application for each built-in menu item, and
selection of at least one of the built-in menu items launches a built-in application page that provides functionality for browsing and selecting broadcast television content received by the computer system;
determining that the internal menu markup data includes a placeholder for an offering tile for a customized menu item within the set of menu items for the menu display, wherein:
the customized menu item provides access to online television content,
the placeholder references an application package and a resource for a customized application page, and
selection of the offering tile for the customized menu item launches the customized application page to provide functionality for browsing and selecting categories of the online television content;
searching for the application package and the resource referenced by the placeholder in the storage system external to the media application;
if the application package and the resource referenced by the placeholder are found in the storage system external to the media application:
accessing the application package referenced by the placeholder from the storage system external to the media application,
accessing the resource referenced by the placeholder from the accessed application package,
rendering the one or more built-in menu items and the offering tile for the customized menu item in the menu display of the media application, and
customizing display of the offering tile for the customized menu item using content from the resource of the accessed application package; and
if the application package and the resource referenced by the placeholder are not found in the storage system external to the media application:
rendering the one or more built-in menu items in the menu display of the media application, and setting the offering tile for the customized menu item to be hidden from view.

2. The method of claim 1 wherein the placeholder included in the internal menu markup data of the media application specifies static references identifying the application package and the resource for the customized application page.

3. The method of claim 2 wherein the customized menu item within the set of menu items for the menu display of the media application may be altered by replacing the application package and the resource identified by the static references with a different application package and a different resource that are identified by the static references.

4. The method of claim 1 wherein the resource is a graphical image that updates a graphic displayed by the offering tile for the customized menu item.

5. The method of claim 1 wherein the resource is a string that labels the offering tile for the customized menu item.

6. The method of claim 1 further comprising:
searching the storage system external to the media application for a resource provider identifier to find the application package referenced by the placeholder included in the internal menu markup data of the media application.

7. The method of claim 6 further comprising:
searching the accessed application package for a string resource identifier to find the resource referenced by the placeholder included in the internal menu markup data of the media application.

8. The method of claim 1 wherein the internal menu markup data of the media application specifies a priority parameter indicating which menu item within the set of menu items for the menu display of the media application receives focus when the menu display is initially displayed.

9. The method of claim 1 wherein the set of menu items for the menu display of the media application includes a menu item for an external, third-party application resident on the computer system.

10. A computer-readable storage medium having computer-executable instructions stored thereon that, when executed by a processor of a computer system, cause the computer system to perform a computer process for presenting a customized menu item in a menu display of a media application, the computer process comprising:
receiving one or more application packages from a communications network at the computer system, wherein each application package contains one or more resources for customized application pages of the media application;
storing the one or more application packages on the computer system in a storage system external to the media application;
accessing internal menu markup data of the media application for rendering a set of menu items for the menu display;
determining that the internal menu markup data indicates that the set of menu items for the menu display includes one or more built-in menu items installed with the media application, wherein:
the internal menu markup data specifies a reference to a built-in application page of the media application for each built-in menu item, and
selection of at least one of the built-in menu items launches a built-in application page that provides functionality for browsing and selecting broadcast television content received by the computer system;
determining that the internal menu markup data includes a placeholder for an offering tile for a customized menu item within the set of menu items for the menu display, wherein:
the customized menu item provides access to online television content,
the placeholder references an application package and a resource for a customized application page, and
selection of the offering tile for the customized menu item launches the customized application page to provide functionality for browsing and selecting categories of the online television content;
searching for the application package and the resource referenced by the placeholder in the storage system external to the media application;
if the application package and the resource referenced by the placeholder are found in the storage system external to the media application:
accessing the application package referenced by the placeholder from the storage system external to the media application,
accessing the resource referenced by the placeholder from the accessed application package,
rendering the one or more built-in menu items and the offering tile for the customized menu item in the menu display of the media application, and
customizing display of the offering tile for the customized menu item displays updated using content from the resource of the accessed application package; and
if the application package and the resource referenced by the placeholder are not found in the storage system external to the media application:
rendering the one or more built-in menu items in the menu display of the media application, and
setting the offering tile for the customized menu item to be hidden from view.

11. The computer-readable storage medium of claim 10 wherein the placeholder included in the internal menu markup data of the media application specifies static references identifying the application package and the resource for the customized application page.

12. The computer-readable storage medium of claim 11 wherein the customized menu item within the set of menu items for the menu display of the media application may be altered by replacing the application package and the resource identified by the static references with a different application package and a different resource that are identified by the static references.

13. The computer-readable storage medium of claim 10 wherein the resource is a graphical image that updates a graphic displayed by the offering tile for the customized menu item.

14. The computer-readable storage medium of claim 10 wherein the resource is a string that labels the offering tile for the customized menu item.

15. The computer-readable storage medium of claim 10 further comprising stored computer-executable instructions for:
searching the storage system external to the media application for a resource provider identifier to find the application package referenced by the placeholder included in the internal menu markup data of the media application.

16. The computer-readable storage medium of claim 15 further comprising stored computer-executable instructions for:

searching the accessed application package for a string resource identifier to find the resource referenced by the placeholder included in the internal menu markup data of the media application.

17. The computer-readable storage medium of claim 10 wherein the internal menu markup data of the media application specifies a priority parameter indicating which menu item within the set of menu items for the menu display of the media application receives focus when the menu display is initially displayed.

18. The computer-readable storage medium of claim 10 wherein the set of menu items for the menu display of the media application includes a menu item for an external, third-party application resident on the computer system.

19. A system comprising:
   a network adapter that receives one or more application packages from a communications network, each application package containing one or more resources for customized application pages of a media application executed by the system;
   a storage system external to the media application that stores the one or more application packages;
   a processor that:
      accesses internal menu markup data of the media application for rendering a set of menu items for the menu display,
      determines that the internal menu markup data indicates that the set of menu items for the menu display includes one or more built-in menu items installed with the media application, wherein:
         the internal menu markup data specifies a reference to a built-in application page of the media application for each built-in menu item, and
         selection of at least one of the built-in menu items launches a built-in application page that provides functionality for viewing the browsing and selecting broadcast television content received by the computer system,
      determines that the internal menu markup data includes a placeholder for an offering tile for a customized menu item within the set of menu items for the menu display, wherein:
         the customized menu item provides access to online television content,
         the placeholder references an application package and a resource for a customized application page, and
         selection of the offering tile for the customized menu item launches the customized application page to provide functionality for browsing and selecting categories of the online television content,
      searches for the application package and the resource referenced by the placeholder in the storage system external to the media application,
      if the application package and the resource referenced by the placeholder are found in the storage system external to the media application:
         accesses the application package referenced by the placeholder from the storage system external to the media application,
         accesses the resource referenced by the placeholder from the accessed application package,
         renders the one or more built-in menu items and the offering tile for the customized menu item in the menu display of the media application, and
         customizes display of the offering tile for the customized menu item using content from the resource of the accessed application package, and
      if the application package and the resource referenced by the placeholder are not found in the storage system external to the media application:
         renders the one or more built-in menu items in the menu display of the media application, and
         sets the offering tile for the customized menu item to be hidden from view.

20. The system of claim 19 wherein:
   the placeholder included in the internal menu markup data of the media application specifies static references identifying the application package and the resource for the customized application page, and
   the customized menu item within the set of menu items for the menu display of the media application may be altered by replacing the application package and the resource identified by the static references with a different application package and a different resource that are identified by the static references.

* * * * *

UNITED STATES PATENT AND TRADEMARK OFFICE
CERTIFICATE OF CORRECTION

| | | |
|---|---|---|
| PATENT NO. | : 8,015,506 B2 | Page 1 of 1 |
| APPLICATION NO. | : 11/657244 | |
| DATED | : September 6, 2011 | |
| INVENTOR(S) | : David Fleishman et al. | |

It is certified that error appears in the above-identified patent and that said Letters Patent is hereby corrected as shown below:

In column 12, line 29, in Claim 10, after "menu item" delete "displays updated".

In column 13, line 36, in Claim 19, after "functionality for" delete "viewing the".

Signed and Sealed this
Eighth Day of November, 2011

David J. Kappos
*Director of the United States Patent and Trademark Office*